(12) United States Patent
Dempsey et al.

(10) Patent No.: US 7,550,192 B2
(45) Date of Patent: Jun. 23, 2009

(54) RESILIENT FLOOR TILE

(75) Inventors: Robert Dempsey, Flemington, NJ (US); Donald C. Ferguson, Bordentown, NJ (US); Andrei Sharygin, Columbus, NJ (US); Richard Whitehouse, Yardville, NJ (US)

(73) Assignee: Congoleum Corporation, Merceville, NJ (US)

( * ) Notice: Subject to any disclaimer, the term of this patent is extended or adjusted under 35 U.S.C. 154(b) by 0 days.

(21) Appl. No.: 10/427,778

(22) Filed: Apr. 30, 2003

(65) Prior Publication Data

US 2004/0219339 A1    Nov. 4, 2004

(51) Int. Cl.
*B32B 23/02* (2006.01)
*B32B 7/02* (2006.01)

(52) U.S. Cl. .................... 428/192; 428/195.1; 428/161; 428/204; 428/212; 428/220

(58) Field of Classification Search ................. 428/142, 428/161, 192, 195.1, 204, 219, 44, 157, 212, 428/220
See application file for complete search history.

(56) References Cited

U.S. PATENT DOCUMENTS

| | | | |
|---|---|---|---|
| 2,045,382 A * | 6/1936 | Elmendorf | 52/586.2 |
| 2,200,270 A | 5/1940 | Flores | |
| 2,230,074 A | 1/1941 | Caperton | |
| 2,558,378 A * | 6/1951 | Petry | 524/557 |
| 2,713,697 A | 7/1955 | Willcox | |
| 3,061,066 A | 10/1962 | Re Casino | |
| 3,133,848 A * | 5/1964 | Mountain et al. | 264/76 |
| 4,547,245 A | 10/1985 | Colyer | |
| 4,678,528 A | 7/1987 | Smith et al. | |
| 4,772,500 A * | 9/1988 | Stroppiana | 428/46 |
| 4,778,547 A | 10/1988 | Becker et al. | |
| 4,997,323 A | 3/1991 | Giandalia et al. | |
| 5,077,112 A | 12/1991 | Hensel et al. | |
| 5,328,730 A | 7/1994 | Lowe | |
| 5,380,794 A | 1/1995 | Schaefer et al. | |
| 5,560,797 A | 10/1996 | Burt et al. | |
| 5,627,231 A * | 5/1997 | Shalov et al. | 524/523 |
| 5,637,378 A | 6/1997 | Hensler et al. | 428/192 |
| 5,670,228 A | 9/1997 | Kakamu et al. | |

(Continued)

OTHER PUBLICATIONS

U.S. Appl. No. 09/765,713, MacQueen et al.

*Primary Examiner*—Jennifer McNeil
*Assistant Examiner*—Lawrence D Ferguson
(74) *Attorney, Agent, or Firm*—Choate, Hall & Stewart LLP; Brenda Herschbach Jarrell, J.D.

(57) ABSTRACT

A resilient floor tile is described that comprises a base; a protective film layer; and a decorative layer disposed between the base and the protective film layer; wherein the resilient floor tile has a top surface and a convex edge along a perimeter of the top surface. In another embodiment, the resilient floor tile comprises a decorative layer comprising a printed ink forming a decorative pattern disposed between a base and a protective film layer; wherein the decorative pattern extends over at least a portion of a contoured edge of the tile such that the decorative pattern is substantially undistorted. The process for making a resilient floor tile comprises preheating a printed tile blank; cutting and molding the printed tile blank concurrently to form a resilient floor tile having a convex edge along a top, outer perimeter of the resilient floor tile.

66 Claims, 8 Drawing Sheets

U.S. PATENT DOCUMENTS

| | | |
|---|---|---|
| 5,728,476 A | 3/1998 | Harwood et al. |
| 5,950,378 A | 9/1999 | Council et al. |
| 6,103,044 A | 8/2000 | Harwood et al. |
| 6,254,956 B1 | 7/2001 | Kjellqvist et al. |
| 6,260,326 B1 | 7/2001 | Muller-Hartburg |
| 6,385,936 B1 | 5/2002 | Schneider |
| 6,440,543 B1 | 8/2002 | Vieluf |
| 6,790,512 B2* | 9/2004 | MacQueen et al. .......... 428/147 |
| 6,875,989 B2* | 4/2005 | Nolt ........................ 250/462.1 |
| 2001/0038910 A1 | 11/2001 | MacQueen et al. |
| 2004/0146695 A1 | 7/2004 | Hardwick ................... 428/157 |
| 2004/0231284 A1 | 11/2004 | Ceysson et al. |
| 2006/0043633 A1 | 3/2006 | Dempsey et al. ............. 264/163 |
| 2006/0083902 A1 | 4/2006 | Jarosz et al. .............. 428/195.1 |

\* cited by examiner

RESILIENT FLOOR TILE

BACKGROUND OF THE INVENTION

1. Field of the Invention

The invention relates generally to floor tiles. More specifically, the invention is directed to a resilient floor tile having a contoured edge and a method for making the same.

2. Description of Related Art

Resilient floor coverings are produced in the form of a continuous sheet or in the form of a tile, such as a vinyl composition tile. Typically, resilient floor tiles are installed in a butt-fit arrangement, wherein the side of each tile is in physical contact with the sides of adjacent tiles. The tiles are secured to the subfloor through the use of an adhesive; however, there is typically no filler or adhesive used between the adjoining sides of the tiles. As such, one disadvantage of this type of installation is the presence of gaps or openings at tile joints, which may result from an uneven cut along the side of a particular tile during manufacture, an uneven subfloor or thermal contraction of the tiles. Another disadvantage of this type of tile and installation is maintaining each tile at the same height on the floor as the tiles adjacent to it. If one tile is slightly higher than an adjacent tile, a "step" is created between these tiles, which may result in chipping or breakage of the tile portion that is higher than the surface of the adjacent tile. In addition, the side of the tile that extends above the adjacent tile surface may also act to trap dirt along that side, which is typically difficult to remove.

Regardless, attempts have been made to manufacture and install resilient floor tiles to simulate the appearance of ceramic tiles or natural tiles, such as stone tiles, including marble, slate and granite, all of which are typically more expensive than a resilient tile floor. For example, resilient tiles may contain a decorative ink pattern to simulate the surface appearance of ceramic or natural tiles, or they may contain other decorative elements, such as small particles, to similarly simulate the appearance of ceramic or natural tiles. Additionally, some resilient tiles are embossed to simulate the grout that is used between ceramic and natural tiles when installed as a flooring. However, these attempts have never quite matched the appearance of a ceramic or natural tile nor the appearance of a flooring having grout between such ceramic or natural tiles.

One might consider installing existing resilient floor tiles with grout; however, there are several disadvantages to this due mainly to the square edge of the resilient floor tile. First, the square edge would make it difficult to properly place the grout between the tiles so that the grout does not pull out as additional grout is laid. Second, grout will typically shrink in size such that the top of the grout would be below the top surface of adjacent tiles, making the exposed vertical edge of the tile more susceptible to damage and collection of dirt along this edge. Also, particles may be dislodged from this edge by foot traffic and dragged across the top surface of the tile, thereby abrading, marring or scuffing its surface.

Some resilient floor tiles have been made with a beveled or flat, slanted edge. However, in these cases, when the beveled portion is cut, the underlying substrate is exposed, which requires additional processing to cover it up. For example, a paint or coating must be applied to cover this exposed area, which may be a different color from the top surface, thereby failing to simulate a natural stone or ceramic tile appearance, which has a consistent color across its surface. While these tiles are typically installed in a butt-fit arrangement, if grout were used the flat surface of this beveled portion will most likely result in the same difficulty in installing the grout as with a square-edged tile since the edge where the beveled portion meets the vertical side wall of the tile will still be a sharp edge.

Therefore, there is a need for a resilient floor tile that in use more closely simulates the appearance of a ceramic or natural tile and that can allow for installation using grout.

SUMMARY OF THE INVENTION

A resilient floor tile and method for making the same are described. In one embodiment, the resilient floor tile comprises a base; a protective film layer; and a decorative layer disposed between the base and the protective film layer; wherein the base, the protective film layer and the decorative layer form a resilient floor tile having a top surface and a convex edge along a perimeter of the top surface. In another embodiment, the resilient floor tile comprises a base; a protective film layer; and a decorative layer comprising a printed ink forming a decorative pattern disposed between the base and the protective film layer; wherein the base, the protective film layer and the decorative layer form a resilient floor tile having a top surface and a contoured edge along a perimeter of the top surface and wherein the decorative layer extends over at least a portion of the contoured edge such that the decorative pattern is substantially undistorted.

The process for making the resilient floor tile comprises preheating a printed tile blank; cutting the printed tile blank; and molding the printed tile blank to form a convex edge along a top, outer perimeter of the printed tile blank; wherein the cutting and molding are performed concurrently to form a resilient floor tile.

The convex edge of the present invention provides for an surprisingly pleasing simulation of ceramic and natural tile floors, such as stone tile floors, including, marble, slate and granite. The convex or rounded edge allows for installation of the resilient floor tile using grout, whereas tiles having a square edge make grout installation difficult. In addition, a convex edge allows for easier cleanability of the grout and the edge of the tile itself, as compared to a tile having a right angle edge that may have dirt embedded in the exposed vertical side. Further, the print layer extends over the surface of the convex edge, thereby alleviating the need to further print a decorative pattern on what would otherwise be an exposed surface after cutting of a contoured edge along the perimeter of the tile.

Other features of the invention will appear from the following description in which the preferred embodiments are set forth in detail in conjunction with the accompanying drawings.

DETAILED DESCRIPTION OF THE PREFERRED EMBODIMENTS

The structure and function of the preferred embodiments can best be understood by reference to the drawings, which are described below. It should be noted that where the same reference designations appear in different figures, the numerals refer to the same or corresponding structure in each of those locations.

Figure 1A:
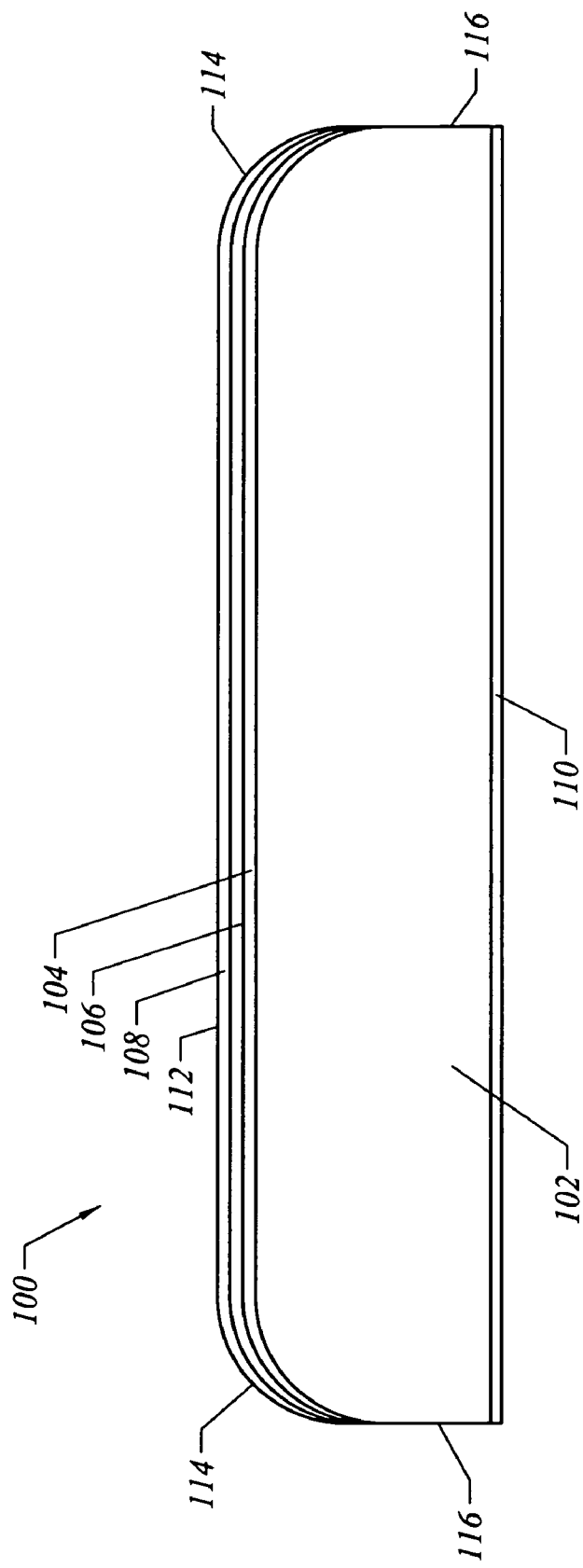
FIG. 1A is a cross-sectional view taken along line A-A of FIG. 2 of a resilient floor tile according to one embodiment of the present invention.
Figure 2:
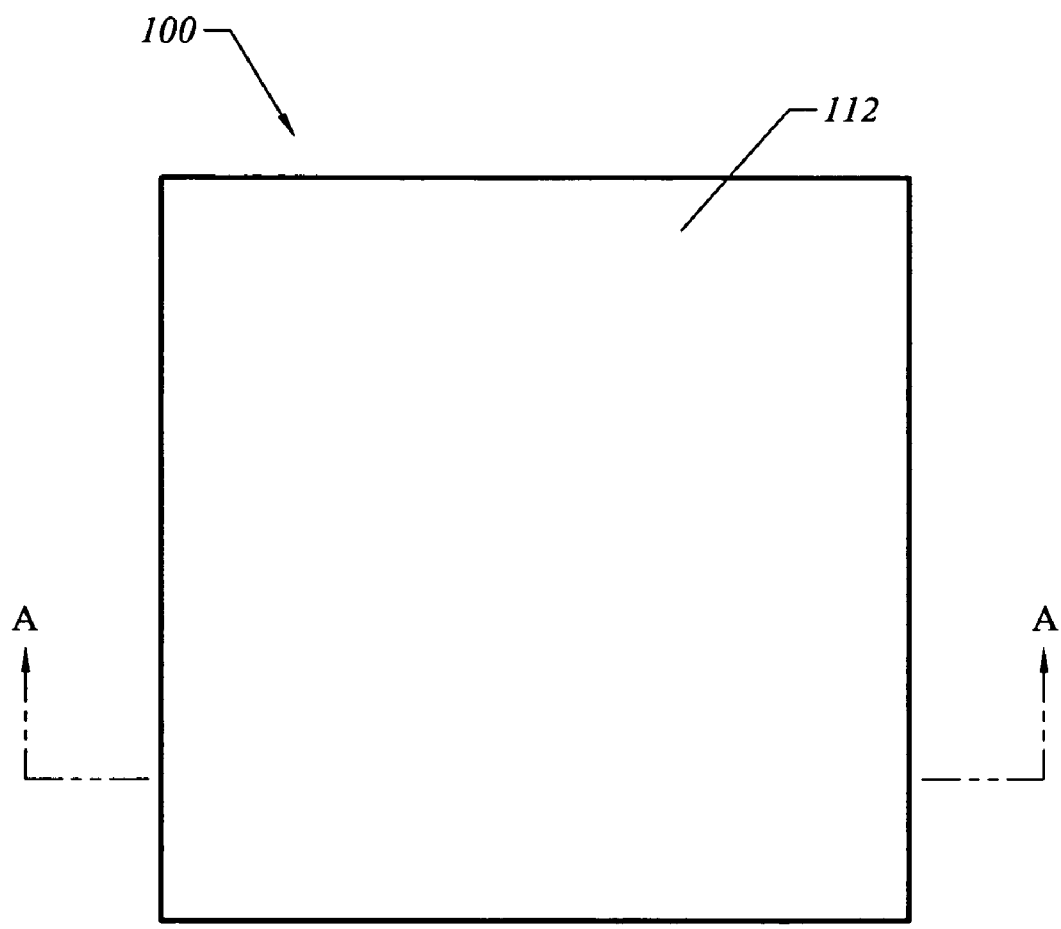
FIG. 2 is a top view of the resilient floor tile of FIG. 1A.

FIG. 1A shows a cross-sectional view taken along line A-A of FIG. 2 of a resilient floor tile according to one embodiment of the present invention. Resilient floor tile 100 is a composite, laminated structure that comprises a base 102, a decorative layer 104 disposed on top of the base 102, a protective film layer 106 disposed on top of the decorative layer 104, a top coat 108 disposed on top of the protective film layer 106, and a bottom coat 110 disposed on the bottom side of the base 102. The resilient floor tile 100 also has a top surface 112 that, in use, is the surface of the resilient floor tile 100 exposed to the environment or foot traffic.

It should be appreciated that "resilient floor tile" refers to those floor tiles that are synthetic or man-made and that have a certain degree of resiliency or flexibility. Materials useful in making a resilient floor tile may include organic materials, such as polymeric materials, including, for example, vinyl or mixtures of organic and inorganic materials. Accordingly, the base 102 may be made of any material useful in making a resilient floor tile. For example, the base may be a mixture of limestone and a polymeric resin and may also include plasticizers and pigments. More specifically, the polymeric resin may be a copolymer or a homopolymer. Specific examples of base compositions include a vinyl composition that includes limestone, acetate polyvinylchloride resin, plasticizer and, optionally, pigments, where the organic materials function as a binder for the limestone. Alternatively, the base may be a vinyl composition that includes limestone, polyvinylchloride homopolymer, plasticizer and, optionally, pigments, where the organic materials also function as a binder for the limestone.

It should be appreciated generally that the base contributes significantly to the overall flexibility of the resilient floor tile. Again, while any material may be used as the base, it is preferred that the base composition and, therefore, the overall resilient floor tile have some rigidity and not be completely flexible such as a rubber tile or solid vinyl tile. Since the binder content of the base affects the level of rigidity of the overall resilient floor tile, it is preferred that the total organic content or binder content of the base be less than approximately 34% by weight, more preferably approximately 20% or less by weight, approximately 18% or less by weight, or approximately 17% or less by weight. Binder contents such as approximately 26% by weight or approximately 28% by weight may also be used.

While the base 102 is shown in FIG. 1A as having a significantly greater thickness than the other layers of the resilient tile 100, it should be appreciated that the thickness of the base 102 may be any desired thickness, and the relative dimensions shown in FIG. 1A are not intended to be limiting. Preferably, however, the thickness of the base 102 is such that it provides most of the structural rigidity to the resilient floor tile 100. More preferably, the thickness of the base 102 is approximately 50-200 mils. A preferred thickness for the entire resilient floor tile 100 is approximately 4 mm.

The decorative layer 104 is disposed on top of the base 102. The decorative layer 104 is any layer that provides a decorative pattern or design to the resilient floor tile 100. In its simplest form, the decorative layer may be a printed ink pattern that provides a decorative pattern or design. Alternatively, the decorative layer 104 may be a plurality of particles or chips of various solid materials, such as wood, textiles, metals or plastics that are disposed on top of or embedded in the top of the base 102. Preferably such particles or chips will adequately adhere to the base; however, an adhesive may be used if necessary. More preferably, such particles or chips comprise polyvinylchloride chips. It should be appreciated that the decorative layer may not be a continuous layer that covers the entire top surface of the base. For example, where the decorative layer comprises an ink layer that forms a decorative pattern on the base, the ink itself may not cover the entire top surface of the base, as it will only be on those portions of the base required to make the decorative pattern.

It should be appreciated that while the decorative layer 104 is shown in FIG. 1A as being disposed on top of the base 102, the decorative layer may actually be disposed anywhere between the base and any other layer in the resilient floor tile. For example, a top-print film may be used (not shown). In this case, the decorative layer would be an ink layer that provides a decorative pattern or design that is printed on one side of a film, preferably a polymeric film, such as polyvinylchloride. This top-print film is placed on the base with the printed ink side facing up, such that the film itself would be disposed directly on top of the base. In this case, an additional film layer, the top-print film, would be disposed between the base and the decorative layer or printed ink layer. Typically, such top-print film has an approximate thickness of 1.5-2 mils. Using a top-print film allows for the decorative layer to be printed on the top-print film before being placed on the base, which avoids having to print ink directly onto the base. Such printing may be done through the use of transfer paper.

It should be appreciated that the relative thickness shown in FIG. 1A for the decorative layer 104 is only for illustrative purposes and should not be considered limiting. The decorative layer 104 may be any desired thickness but in the case of printed ink, it is preferably approximately 0.5 mils. Therefore, in combination with a top-print film, the total thickness would be approximately 2-2.5 mils.

The protective film layer 106 is a film that is disposed on top of the decorative layer 104. The protective film layer 106 is preferably a polymeric film and is used to protect the decorative layer once the resilient floor tile 100 is placed in use. For example, the protective film layer 106 may be used to protect the decorative layer 104 from scuffing, marring and abrasion caused by wear or foot traffic on the resilient tile 100.

The protective film layer 106 may be, for example, a cap film, which is a polymeric film, such as a polyvinylchloride film. Such a cap film may be disposed directly on top of a decorative layer comprising either a printed ink decorative pattern or on top of a decorative layer comprising a plurality of particles or chips disposed on the base.

Alternatively, the protective film layer may be a back-print film. A back-print film is a film having a printed ink pattern that provides a decorative pattern or design on a bottom side of the back-print film. This back-print film is positioned on top of the base with the printed ink pattern facing the base of the tile. The printed ink pattern then becomes the decorative layer of the resilient floor tile, and the back-print film itself acts as the protective layer to protect the printed ink or decorative layer when the tile is used. This avoids the use of a separate protective layer as would otherwise be used with a top-print film. Similar to a top-print film, however, a back-print film allows for the decorative layer to be disposed on the top-print film before being placed on the base, which avoids having to print ink directly onto the base.

It should be appreciated that the relative thickness shown in FIG. 1A for the protective film layer 106 is only for illustrative purposes and should not be considered limiting. The cap film 106 may be any desired thickness but preferably is approximately 3 mils.

It should be appreciated that the use of a protective film layer is optional. In other words, a protective film layer, such as a cap film or back-print film, is not required in the present invention. In some embodiments of the present invention, the protective film layer may be the top layer or exposed layer of the resilient floor tile. In such cases, floors made using such resilient tiles would typically require waxing to maintain the appearance of the resilient tile.

The top coat 108 is disposed on top of the protective film layer 106. Typically, the top coat 108 comprises a polymeric film, such as a urethane film that is cured using ultraviolet radiation, that is designed to protect the protective film layer 106 and the decorative layer 104. In one embodiment, the top coat 108 is used to avoid waxing of the resilient floor tile in use. In other words, the use of a top coat generally makes the resilient tile a "no-wax" floor tile. The top coat 108 may also comprise additional components, such as particles, including, for example, aluminum oxide or nylon particles, and it may have visible texture. Various top coats that may be used in the present invention are described in U.S. patent application Ser. No. 09/765,713, entitled "Coating Having Macroscopic Texture and Process for Making Same," filed on Jan. 19, 2001, which is incorporated herein by reference in its entirety.

It should be appreciated that the top coat may also act as the protective film layer, for example, in those cases where a top coat, which may comprise a urethane film, is placed directly on the decorative layer without the use of a separate protective film layer. It should also be appreciated, however, that the use of the top coat 108 is optional. Further, although not preferred, the decorative layer may be exposed, which obviates the need for both a protective film layer and a top coat.

Generally, any layer disposed on top of the decorative layer 104 may be used to protect the print layer. Such a protective layer may alternatively be referred to as a "wear layer." Therefore, both the protective film layer 106 and the top coat 108 may each be referred to as a "wear layer" or may be collectively referred to as a "composite wear layer."

The bottom coat 110 is any layer disposed on the bottom of the base 102. Typically, the bottom coat 110 comprises a polymeric film and is designed to maintain the integrity of the base 102 and of the overall resilient floor tile 100, particularly upon application of the other layers on top of the base 102. Application of these other layers on top of the base 102 may result in stress forces that tend to curl or pull the edges of the tile upwards. To counter these forces, the bottom coat 110 may be used. It should be appreciated, however, that use of the bottom coat 110 is optional.

As shown in FIG. 1A, a novel aspect of the present invention is the convex or rounded edge 114 of the resilient floor tile 100. It should be appreciated that this convex edge 114 is located at the top of the resilient tile 100, as opposed to the bottom, and extends around the entire perimeter of the top surface 112 of the resilient tile 100. It should be appreciated that reference to the top surface of the resilient tile 100 refers simply to the top, exposed surface of the tile, regardless of what layer is actually on top. For example, the top surface could be the top of the protective film layer or the top of the top coat, if present.

The convex edge 114 is also contiguous with the vertical side wall 116 of the resilient floor tile 100, which is that portion of the side of the resilient tile 100 that extends from the convex edge 114 to the bottom of the resilient tile 100. In other words, where the curvature of the convex edge 114 ends, the vertical side wall 116 begins and continues to the bottom of the resilient floor tile 100.

As will be discussed below, it should be appreciated that this convex edge 114 is typically formed after the base 102, the decorative layer 104 and the protective film layer 106 have been put together. As a result, as shown in FIG. 1A, both the decorative layer 104 and the protective film layer 106 extend over at least a portion of the convex edge portion 114 and preferably over the entire curvature of the convex edge 114. A further novel aspect of the present invention is that the decorative pattern provided by the decorative layer 104 that extends over the convex edge portion is substantially undistorted. For example, in the embodiment where the decorative layer comprises a printed ink that forms the decorative pattern, this decorative pattern appears to have little or no visible distortion as it extends over the convex edge portion. In this manner, the decorative pattern remains visible and visually pleasing on the top surface 112 as well as along the convex edge 114 as it extends over the side of the resilient floor tile 100.

It should be appreciated that the convex edge 114 may have any arc or radius of curvature desired. In any case, the print layer 104 and the cap film 106 will extend over at least a portion of the convex edge 114, and, preferably, over the entire curvature of the convex edge 114. In other words, with a curvature having a larger radius or arc, the convex edge 114 will have a greater surface area and will extend further towards the bottom of the resilient floor tile before becoming integral with the vertical side wall 116. In this case, it is preferred that the print layer 104 extend over this larger surface area of the convex edge 114 to cover the entire surface area of the convex edge from the top surface 112 to the point where it becomes integral to the vertical side wall 116. Similarly, a smaller radius or arc would allow for a smaller curved edge having a smaller surface area and a correspondingly higher vertical side wall. It should be appreciated that, generally, the layers on top of the print layer may extend over the convex edge to a lesser extent than the underlying print layer. It should also be appreciated that it is not necessary for the print layer to extend over the entire surface area of the convex edge. In other words, the print layer will extend along the entire length of the edge or side of the resilient floor tile but may only cover a portion of the convex edge from the top surface to the point where it becomes integral to the vertical side wall.

It should further be appreciated that the convex edge 114 is just one example of the type of edge that may be used on the tile. The edge may include other contours or shapes, such as a flat, beveled edge. Although a convex or rounded edge is more preferred for use in installing the resilient floor tiles of the present invention with grout, the decorative layer and decorative pattern may still be disposed over an edge having other contours, such as a beveled edge, so as to not distort the decorative pattern.

It should also be appreciated that the side wall 116 is substantially solid, meaning that while it may have imperfections, such as cracks or small holes, it does not have any pre-formed openings or openings of predetermined shapes and sizes that may be used for other purposes, for example, to accept interlocking male portions from adjacent tiles. Further, the side wall 116 does not have to be perfectly vertical or flat, particularly if the resilient floor tile 100 is to be installed using grout. Such an installation has the advantage of accommodating imperfectly-shaped side walls.

Figure 1B:
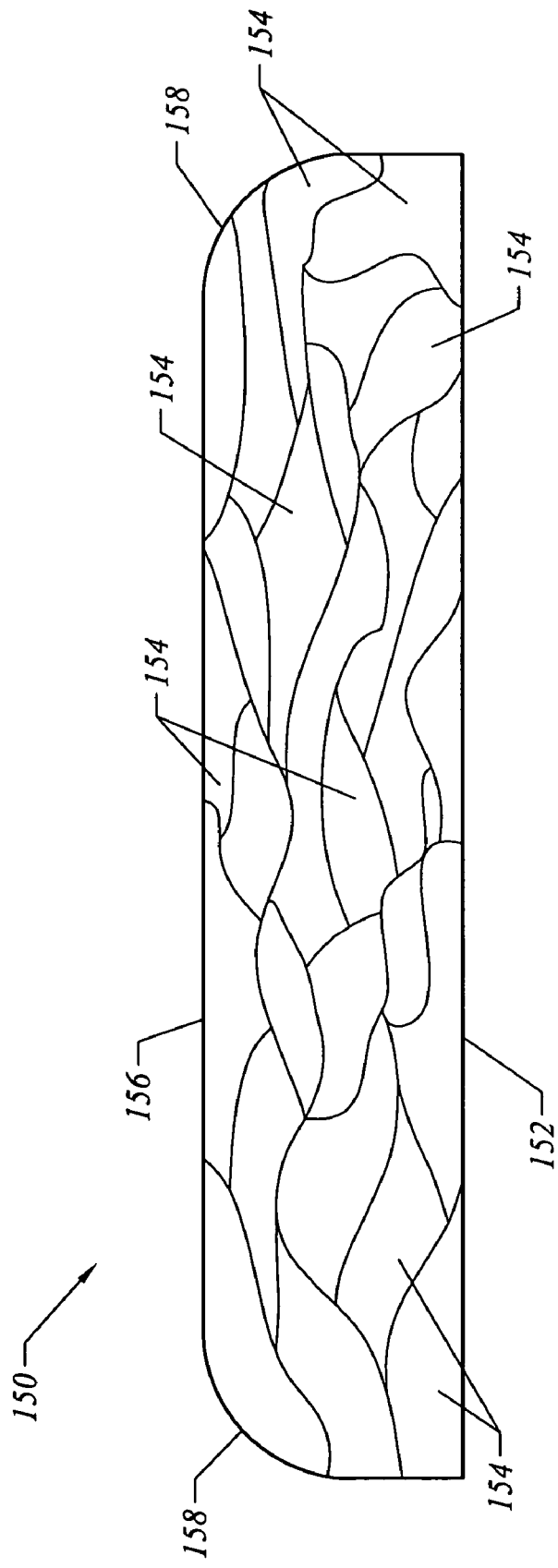
FIG. 1B is a cross-sectional view of a resilient floor tile according to another embodiment of the present invention.

FIG. 1B is a cross-sectional view of a resilient floor tile according to another embodiment of the present invention. While FIG. 1A has been described as having multiple layers on top of a base, FIG. 1B illustrates another embodiment of the present invention, which is a resilient floor tile 150 having only a base 152 with particles or chips 154 dispersed throughout that provide a decorative effect on the top surface 156 of the tile 150. (Only a few of the chips 154 are labeled in FIG. 1B.) These chips 154 may be selected from various solid materials, such as wood, textiles, metals or plastics, such as thermoplastic or thermoset polymers including, for example, homopolymers or copolymers, specifically, for example, vinyl acetate resins or polyvinylchloride, and may have different colors ranging from white to dark. Further, the number of chips 154 used may vary. While FIG. 1B illustrates a resilient floor tile made using a significant number of chips such that each chip is compressed against another chip, a much lower concentration of chips 154 may be used. In this latter case, obviously the base will contain a higher concentration of, for example, limestone.

The resilient floor tile 150 has convex edges 158 that extend around its perimeter at the top of the base 152. Similar to the embodiment of FIG. 1A, it should be appreciated that any arc or radius of curvature of the convex edges 158 may be used. Further, it should be appreciated that the edge may include other contours or shapes, such as a flat, beveled edge. The resilient floor tile 150 does not have any additional layers on top; however, it should be appreciated that additional layers may be added. For example, a protective film layer, such as a cap film, or a top film that acts as a protective film layer, may be disposed on top of the base 152.

From the foregoing, it should be appreciated that any resilient floor tile composition may be used in the present invention. For example, resilient floor tiles known in the art, such as any resilient floor tile base having polyvinylchloride, may be used to provide a resilient floor tile having a contoured edge, such as a rounded or convex edge. Further, any resilient floor tile construction may be used in the present invention, including the use of only a base, such as a base having particles or chips, or a base having multiple layers thereon.

FIG. 2 is a top view of the resilient floor tile of FIG. 1A. As shown in FIG. 2, the resilient floor tile 100 is square. Further, it is evident from FIGS. 1 and 2 that the decorative layer 104, the cap film 106, the top coat 108 and the bottom coat 110 do not extend beyond the perimeter or boundary of the base 102. In other words, the horizontal dimensions of each layer are similar and are aligned with the perimeter of the base 102. It should be appreciated, however, that the resilient floor tile of the present invention may be any shape, including, for example, round, oval, rectangular, triangular, a polygon having any number of sides, or any other shape. In these cases, each layer of the resilient floor tile would have a substantially similar shape to every other layer, except with respect to a decorative layer, which as described above will generally take the shape of the desired decorative pattern and may or may not be a continuous or complete layer across the entire surface of the resilient floor tile. As shown, preferably, the shape of the resilient tile of the present invention is square. More preferably, the resilient tile of the present invention is 9"×9", 12"×12", 14"×14", 16"×16" or 18"×18". It should be appreciated from FIG. 2 that the corners of the resilient floor tile 100 are square, although it is not necessary that the corners be square.

Figure 3:
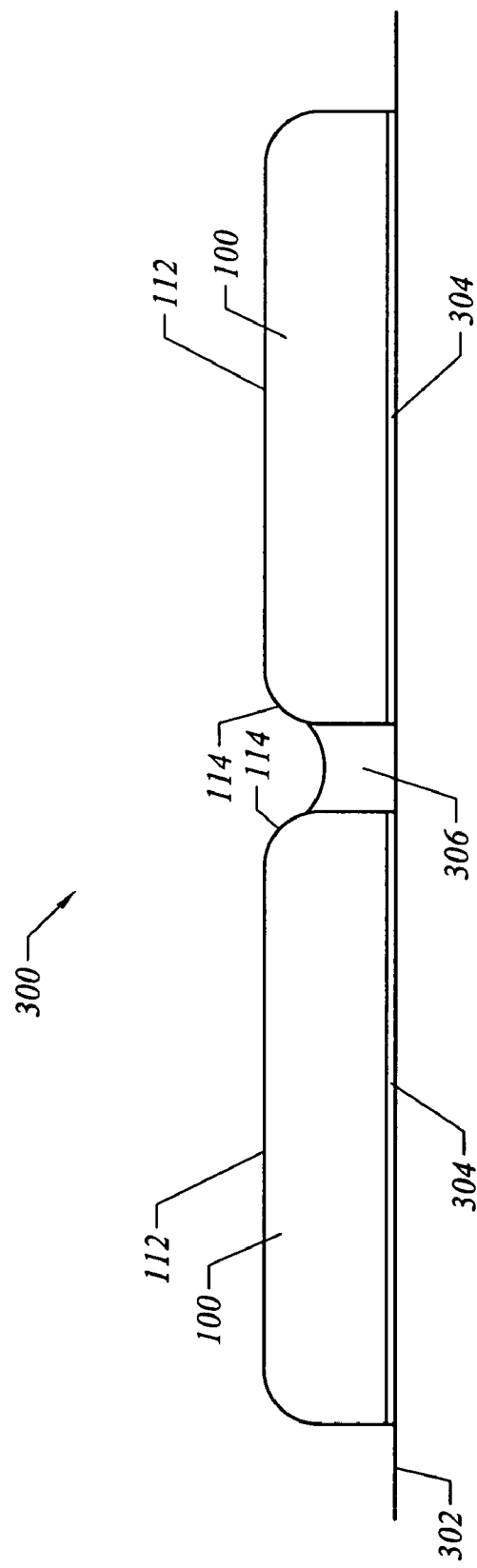
FIG. 3 is a partial plan view of a flooring made with resilient floor tiles according to one embodiment of the present invention.

FIG. 3 is a partial plan view of a flooring made with resilient floor tiles according to one embodiment of the present invention. Specifically, FIG. 3 illustrates a flooring 300 installed using resilient floor tiles made according to the present invention with grout. For illustrative purposes, only two resilient floor tiles 100 are shown (individual layers of each tile are not shown); however, an entire flooring would obviously be made using any desired number of resilient tiles necessary to cover the flooring area of interest and with any resilient floor tile made according to the present invention. FIG. 3 shows the subfloor 302 and an adhesive layer 304 disposed between the bottom of each resilient tile 100 and the subfloor 302. It should be appreciated that any type of adhesive may be used, but, preferably, either a pressure sensitive adhesive or a wet-set adhesive, or combination thereof, is used. Grout 306 is installed between the adjacent resilient floor tiles 100. As shown, the top level of the grout 306 is below the top surface 112 of each of the resilient floor tiles 100. The combination of the grout 306 being disposed below the top surfaces 112 of each of the adjacent resilient floor tiles 112, each having a convex edge 114, is what gives the flooring 300 the appearance of a ceramic or natural tile floor, such as a stone, marble, slate or granite.

It should be appreciated that the resilient floor tiles of the present invention may also be installed in a butt-fit arrangement, wherein each tile is positioned physically against an adjacent tile. In this installation, grout would not be used; however, the tiles would be adhered to the subfloor in the same manner by using an adhesive such as a pressure sensitive adhesive or a wet-set adhesive. A joint sealer may be used, however, to fill any gaps or openings between adjacent tiles.

Figure 4:
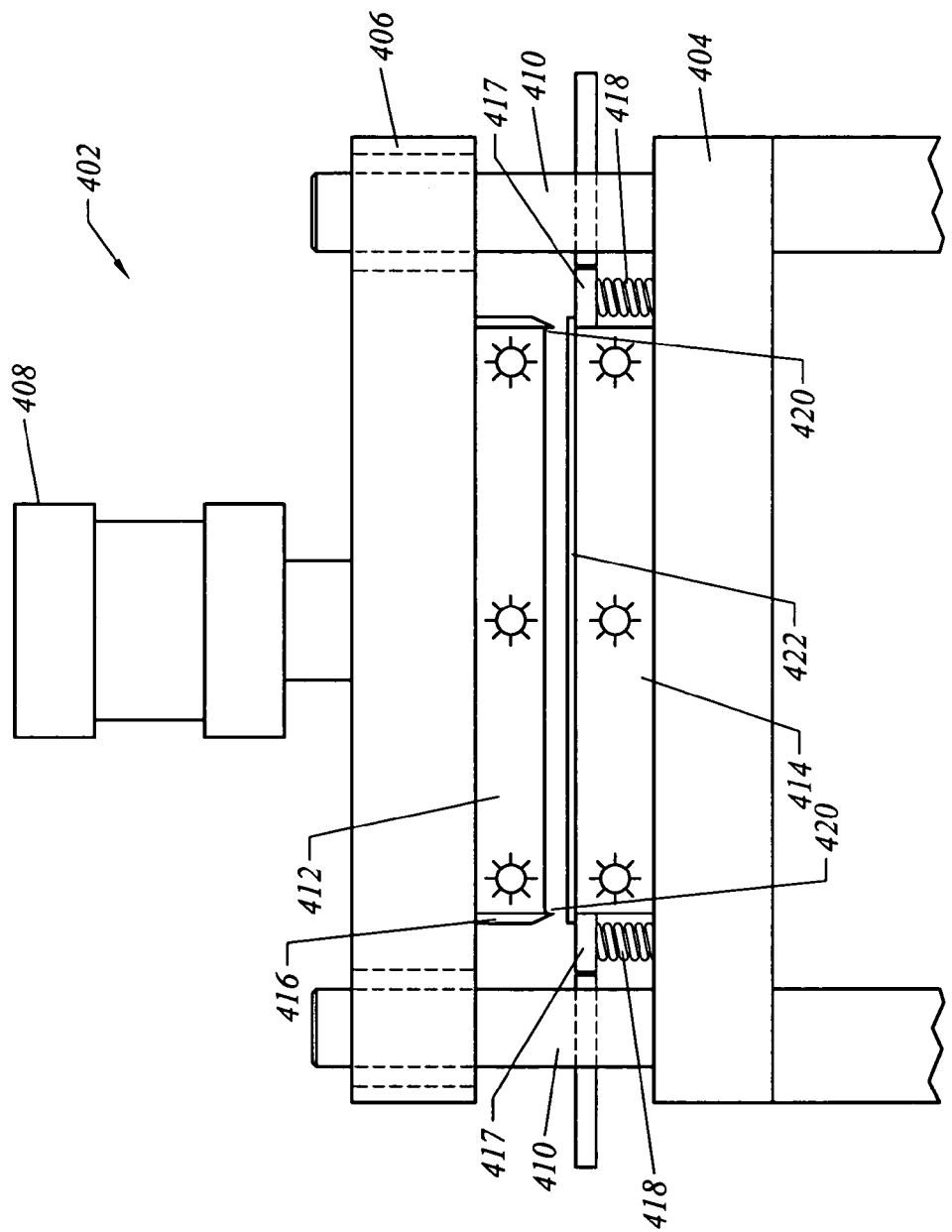
FIG. 4 is a partial plan view of a press and die according to one embodiment of the present invention.

FIG. 4 is a partial plan view of a press and die according to one embodiment of the present invention. In general, it should be appreciated that one of skill in the art is familiar with such presses and how they are constructed and operated; Generally, the press 402 comprises a base 404 and an upper moveable portion 406 that can be moved in an up and down motion by a hydraulic cylinder 408 along guideposts 410. An upper die plate 412 is attached to the upper movable portion 406, and a corresponding lower die plate 414 is attached to the base 404. A knife 416 is attached to the upper die plate 412 about its perimeter. It should be appreciated that FIG. 4 actually provides a cross-sectional view of the upper die plate 412 to illustrate the curvature 420 of the upper die plate 412 and the cutting edge 420 of the knife 416. Therefore, as will be discussed in connection with FIG. 5, the curvature 420 and the knife 416 actually extend around the entire perimeter of the upper die plate 412.

Also shown in FIG. 4 are scrap ejector plates 417, which are each supported by springs 418. A representative resilient tile blank 422 is also shown on top of the lower die plate 414. One of skill in the art will appreciate that there are other components of the press 402 that are not shown, such as a heater and temperature control system that provide for heating either or both of the upper die plate 412 and lower die plate 414 to a desired set point temperature.

Figure 5:
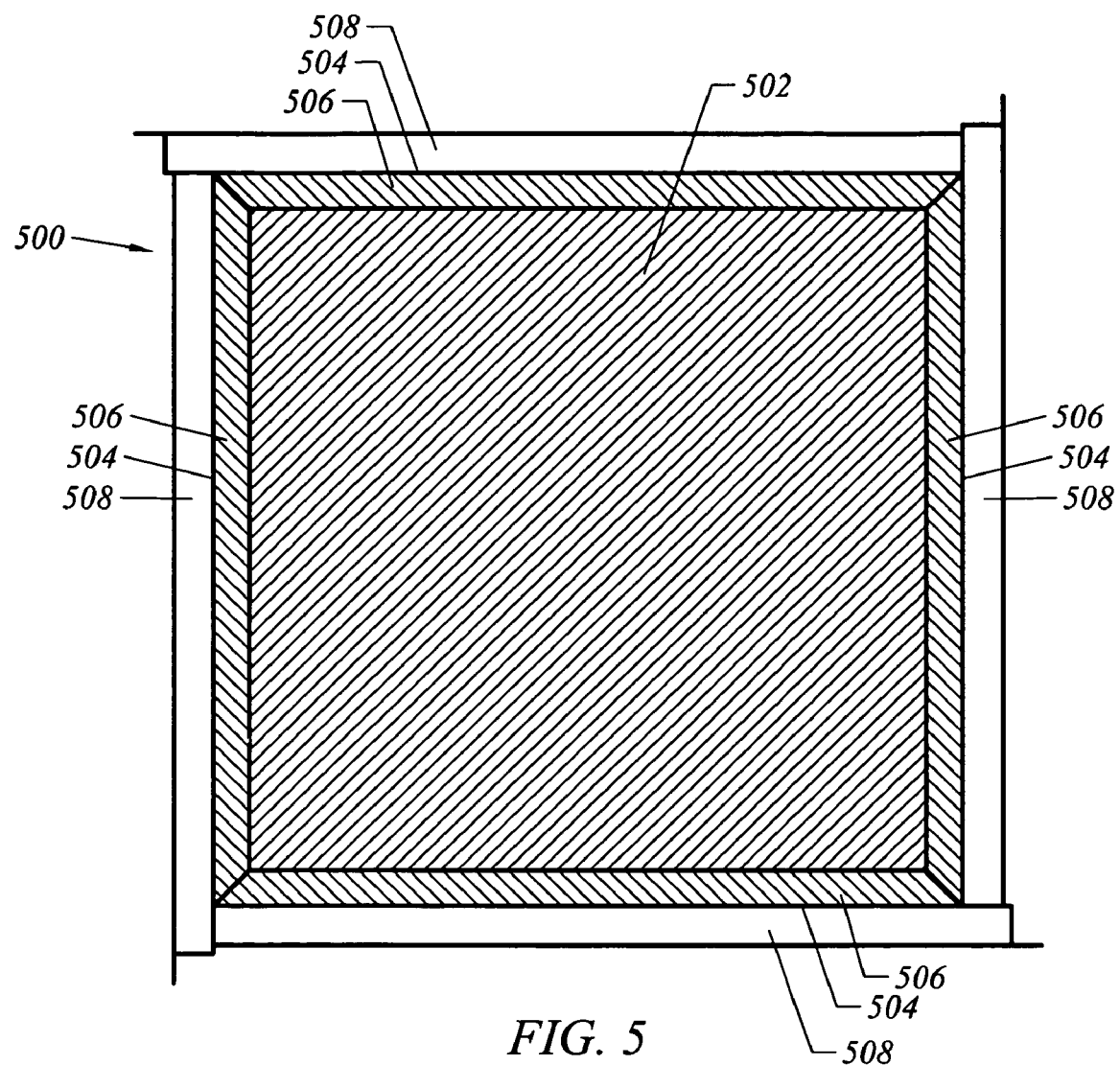
FIG. 5 is a bottom view of an upper die plate according to one embodiment of the present invention.

FIG. 5 is a bottom view of an upper die plate according to one embodiment of the present invention. The upper die plate 500 comprises a center portion 502, which is generally a large block made of metal, and four side portions 504 that are beveled and connected at each corner and to the center portion 502. Each side portion 504 is constructed to have a contoured surface 506 that upon pressing a resilient tile blank will impart the desired shape to the edge of the tile. For example, this contoured surface 506 may be a concave surface that will impart a convex edge to the tile. Alternatively, the contoured surface 506 may be a flat angled surface that imparts a beveled edge to the tile. The upper die plate 500 may also be construed with a plurality of holes (not shown) in the center portion 502 to allow for the passage of air during pressing.

Also shown in FIG. 5, although not inherently part of the upper die plate, is a knife 508. The knife 508 extends around the entire perimeter of the upper die plate 500, and as shown in FIG. 4 comprises a beveled edge that provides a sharp edge at its tip adjacent to the side portions 504 of the upper die plate 500.

Figure 6A:
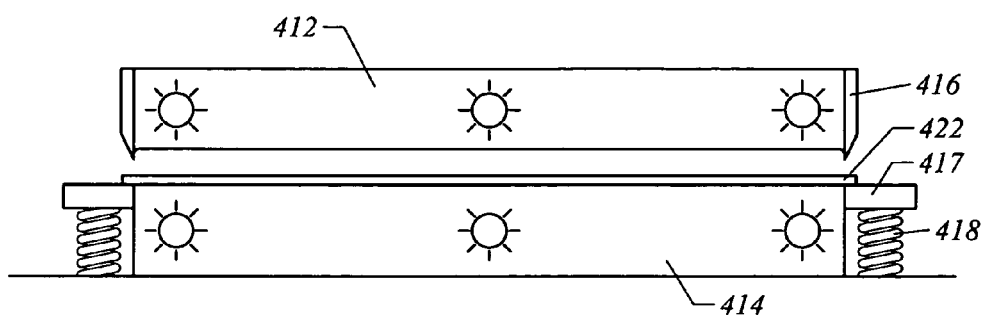
FIG. 6A is a partial plan view of a die at a first operating position according to one embodiment of the present invention.

FIG. 6A is a partial plan view of a die at a first operating position according to one embodiment of the present invention. FIG. 6A illustrates the upper die plate 412 and the knife 416. It should be appreciated that FIG. 6A is actually a cross-sectional view of the upper die plate 412 and the knife 416 to illustrate the curvature of the upper die plate 412 and the cutting edge of the knife. Also shown are the resilient tile blank 422, the lower die plate 414 and the scrap ejector plates 417 and their corresponding springs 418. In this first operating position, the resilient tile blank 422 has been loaded into the press and is ready to be cut and molded.

Figure 6B:
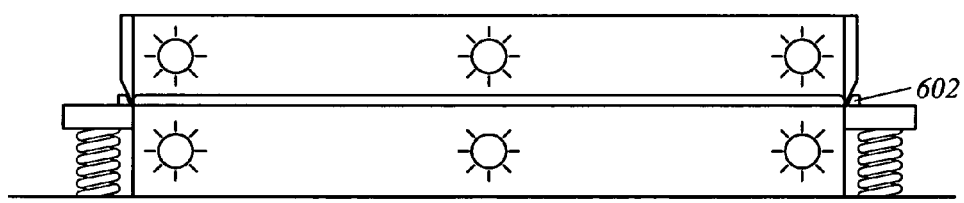
FIG. 6B is a partial plan view of the die of FIG. 6A at a second operating position according to one embodiment of the present invention.

FIG. 6B is a partial plan view of the die of FIG. 6A at a second operating position according to one embodiment of the present invention. In this second operating position, the upper die plate 412 has been lowered using the hydraulic cylinder 408, thereby cutting the perimeter portions 602 from the resilient tile blank 422 and pressing the resilient floor tile blank 422 between the upper die plate 412 and the lower die plate 414. The compression forces imparted from the upper die plate 412 and the stationary lower die plate 414 act to mold the resilient floor tile blank 422 and impart the curvature 420 of the upper die plate 412 to the top edge of the resilient floor tile blank 422, thereby forming a resilient floor tile. In essence, this process cuts and molds the resilient floor tile blank concurrently.

When the upper die plate 412 is in the second operating position, the scrap ejector plates 417 are depressed. After the cutting and molding is complete, the upper die plate 412 is returned to its first operating position to begin the cycle again with a second resilient floor tile blank. Once the upper die plate is lifted from this second operating position to return to its first operating position, the scrap ejector plates 417 return to their original position and hold the scrap or "frame" that has been cut and separated from the resilient floor tile. As will be discussed below, this enables removal and recycle of this scrape or frame.

Figure 7:
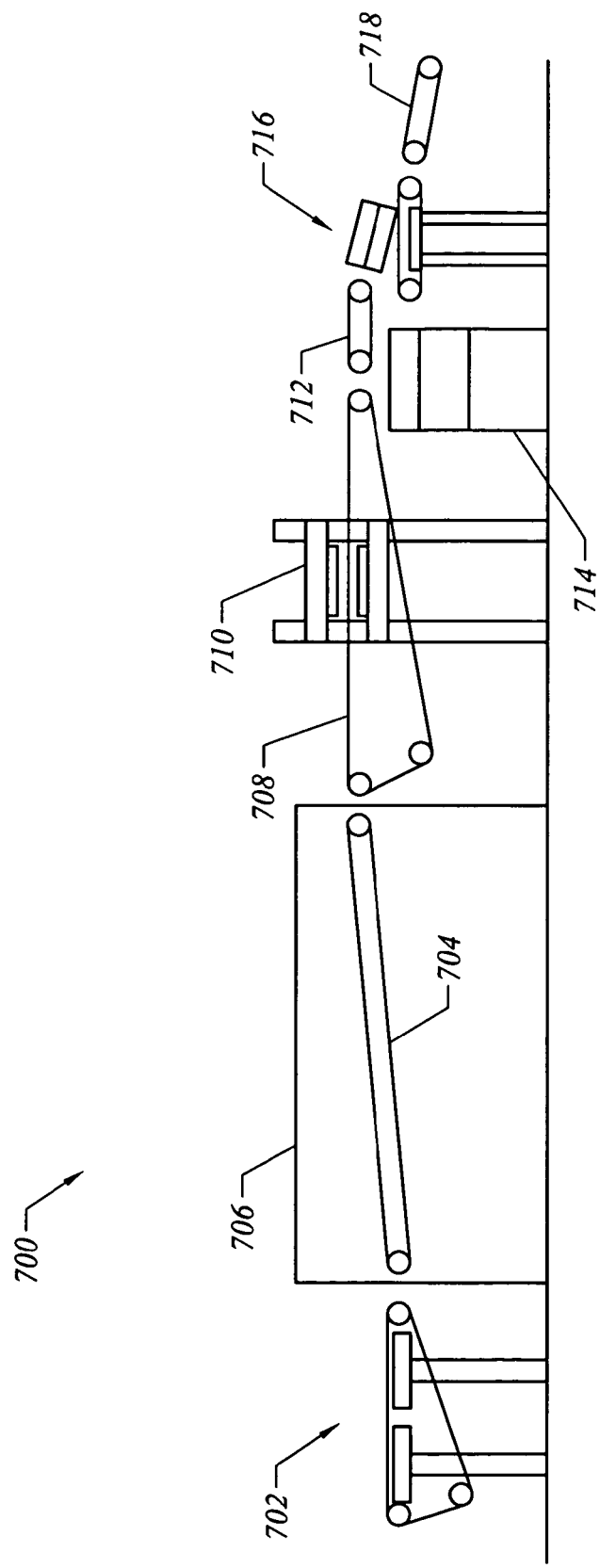
FIG. 7 is a process flow schematic of a process for making a resilient floor tile according to one embodiment of the present invention.

FIG. 7 is a process flow schematic of a process for making a resilient floor tile according to one embodiment of the present invention. The process 700 for cutting and molding a resilient floor tile according to the present invention begins by using a pallet of resilient floor tile blanks. A blank is a resilient floor tile that has already been constructed but not cut into its final dimensions. One of skill in the art will appreciate the various methods for making resilient floor tile blanks and the various compositions and constructions of such resilient floor tiles.

One preferred method for making a vinyl resilient floor tile is described in U.S. patent application Ser. No. 09/765,713, entitled "Coating Having Macroscopic Texture and Process for Making Same," filed on Jan. 19, 2001, incorporated herein by reference in its entirety. In this method, the vinyl tile is made by first mixing a polyvinylchloride resin, plasticizer, pigments, and a high level (~80%) of limestone (i.e., calcium carbonate) filler in a blender held at 115-135° F. The blended powder effluent is then transferred to a continuous mixer held at 320-340° F. for fusion (i.e. chain entanglement) of the limestone-filled resin into thermoplastic pieces of various sizes. The thermoplastic pieces are next sent to calendering roll operations for partial softening and re-fusion of the limestone-filled resin into the shape of a continuous sheet having an exiting temperature of 250-270° F. and a thickness of 50-200 mils. The continuous sheet of tile base is then carried via a conveyor belt to a nip station for lamination of a printed design using either 2 mil thick printed polyvinylchloride film or 0.5 mil thick printed transfer paper. The latter case involves transferring the ink of a printed design, originally on a paper roll, to the tile base at the lamination nip (the paper is subsequently removed with a re-wind operation immediately following the lamination nip).

Next, the continuous sheet of tile base and laminated print layer is conveyed to another nip for lamination of a cap film, which is an ~3 mil thick polyvinylchloride film designed to protect the print layer. Both the cap film and print layer applications rely upon the nip pressure and incoming substrate temperature for lamination; the laminating rolls themselves are not heated. For floors requiring periodic waxing, the polyvinylchloride cap film forms the uppermost layer of the manufactured tile construction (an end-user applied, sacrificial wax layer being the uppermost layer in practice). However, for "no-wax" floors, a thermosetting topcoat is applied as described below to the top of the polyvinylchloride cap film during manufacture and forms a surface with sufficient durability that the need for a sacrificial wax layer is eliminated. Nevertheless, and regardless of its final designation as a waxed or no-wax floor tile, the continuous sheet of laminated tile base, print layer, and cap film is then optionally mechanically embossed.

The traditional topcoat application process for no-wax tiles involves the deposition and metering of a liquid film of thermally-curable or radiation-curable resin onto the tile, followed by subsequent curing of the resin to form a durable thermoset topcoat. The traditionally preferred (but not exclusive) coating application method involves the use of a curtain or roll coater to apply and meter ~3 mil of uncured UV-curable resin to the cap film surface of the tile. The coated, but uncured, tiles are then sent through a series of UV-processors containing UV lamps to induce cross-linking of the thermosetting resin, in the case where the coating is a radiation-curable coating. (Alternatively, the tiles would be heated to induce the cross-linking in the case where the coating is a thermally-curable coating.) The back coat is typically applied and cured using a UV processor just prior to the application of the top coat. A thermosetting urethane back coat is also applied with a roll-coater to balance the curling stresses imparted on the tile by the topcoat. Final processing of most no-wax tile products then involves an annealing process to remove processing stresses and to ensure dimensional stability.

It should be appreciated that application of the top coat may be done before or after the process 700 for cutting and molding the resilient floor tile. If the top coat material is a thermoplastic material; the top coat could be applied to the tile blank before being subject to the process 700 of cutting and molding. However, if the top coat material is a thermoset material, it is preferable to apply the top coat after the process 700 of cutting and molding to avoid micro-cracks in the contoured edge portion of the tile.

The pallet of resilient floor tile blanks are placed into a destacker 702, which feeds the blanks one at a time to conveyor belt 704 that passes through a pre-heated oven 706. The pre-heated oven 706 conveys heat to the blanks using heat lamps, or any other device capable of producing heat, as they travel through the pre-heated oven 706 to sufficiently soften the blanks for subsequent cutting and molding. One of skill in the art will appreciate the degree of softness required based upon the composition of the tile blank. For a vinyl or vinyl composition tile blank, it is preferable to heat the blank to a temperature of approximately 100-200° F., more preferably to a temperature of 125-135° F.±5° F., and even more preferably to a temperature of approximately 135° F.±2° F. Preferably, the pre-heated oven 706 has a length of approximately 10 feet, and the conveyor belt 704 travels through the pre-heated over 706 at a speed of approximately 100' per minute to heat the tile blank to this desired temperature.

The tile blanks are then picked-up from the pre-heated oven conveyor belt 704 by an indexing chain-feed conveyor 708 that carries each tile blank and positions it into a cut and mold press 710. In the cut and mold press 710, each tile blank is cut and molded as described above in connection with FIG. 6 to form a resilient floor tile having a contoured edge and a print layer that extends over at least a portion of the contoured edge, which as described above may include any contoured edge, including, for example, a beveled edge or more preferably a convex edge.

After the cutting and molding, the indexing chain-feed conveyor 708 ejects the finished resilient floor tile and the scrap or frame portion out of the cut and mold press 710. Both the finished resilient floor tile and the scrap or frame are then conveyed to a counter/stacker 718. The resilient floor tile and the scrap for frame are conveyed from the indexing chain-feed conveyor 708 to another conveyor belt 712, which is sufficiently separated from the end of the indexing chain-feed conveyor 708 to allow the scrap or frame to fall from the resilient floor tile into a drum 714 for recycle or disposal. The finished resilient floor tiles are then conveyed to a counter/stacker 716 where they are assembled into stacks, preferably stacks of 10 tiles and conveyed by conveyor belt 718 to a pallet for distribution. As noted above, in the case where a top coat is to be applied after the cutting and molding process 700, the stacked and palletized resilient floor tiles are conveyed to a coating line for application of the top coat. In addition, the stacked and palletized resilient floor tiles may also be subjected to an annealing process before distribution.

The invention having been described, the following example is presented to illustrate, rather than to limit the scope of the invention.

EXAMPLE 1

This Example illustrates one embodiment of the present invention using a resilient floor tile comprising multiple layers. A standard uncoated tile blank, specifically a DURASTONE tile from Congoleum Corporation without a top coat was used. This tile has a vinyl composition base and approximately 82% by weight inorganic material and 18% by weight binder or total organic material content. The tile was pre-heated in a 6' long conveyor oven having a belt speed of 4.8 feet per minute and a set point temperature of 240° F., which gave a tile temperature upon exiting the oven of approximately 145±5° F. The tile blank was then fed to the press at which point the tile temperature was approximately 140° F. The press utilized a die constructed to impart a convex shape to the top edge of the tile. The press was set to 20 tons and was closed for approximately 1-2 seconds. The press temperature controller was set to 140° F., which controls the top plate of the press. The bottom plate of the press was kept at room temperature. After pressing, the tile was coated with a UV-curable coating. The final size of the tile was square having the dimensions of 15 and ⅝"×15 and ⅝". No cracks, such as micro cracks, were observed on the convex edge or top surface.

In a similar trial, a UV-coated tile blank similar to the one above but having a top coat was used. The processing was similar to that described above except that the press was set to 8 tons, closed for 5 seconds, and the top plate was controlled at 220° F. The resulting tile, however, exhibited micro cracks around the convex or rounded edges. It is believed that the micro cracks were the result of too much stress from the top coat.

EXAMPLE 2

This Example illustrates one embodiment of the present invention using a resilient floor tile comprising only a base. Two 16"×16" Congoleum CX SERIES commercial tile bases having a CX-47 (earthen beige) pattern and a gauge thickness of 0.10" were adhered to each other using double-sided tape only for the purpose of using a thicker tile to fit the die available for use in this test. The CX SERIES tile base comprises vinyl acetate copolymer, melamine, stabilizer, plasticizer, limestone, and $TiO_2$, having a total binder concentration of approximately 17% by weight. The tile was preheated in a 6' long conveyor oven having a belt speed of 4.8 feet per minute and a set point temperature of 240° F., which gave a tile temperature upon exiting the oven of approximately 150° F. The tile was then fed to the press at which point the tile temperature was approximately 140° F. The press utilized a die constructed to impart a convex shape to the top edge of the tile. The press was set to 30 tons and was closed for approximately 2 seconds. The press temperature controller was set to 140° F., which controls the top plate of the press. The bottom plate of the press was kept at room temperature. The final size of the tile was square having the dimensions of 15 and ¼"×15 and ¼".

Various embodiments of the invention have been described. The descriptions are intended to be illustrative of the present invention. It will be apparent to one of skill in the art that modifications may be made to the invention as described without departing from the scope of the claims set out below. In particular, it will be clear to those skilled in the art that the present invention may be embodied in other specific forms, structures, arrangements, proportions, and with other elements, materials, and components, without departing from the spirit or essential characteristics thereof. For example, it is to be understood that although the invention has been described using as an example a vinyl composition tile, any resilient floor tile may be used. In addition, while the present invention is described as a resilient floor tile, the tile may be used as a wall tile or for other purposes. The presently disclosed embodiments are, therefore, to be considered in all respects as illustrative and not restrictive, the scope of the invention being indicated by the appended claims, and not limited to the foregoing description.

What is claimed is:

1. A resilient floor tile, comprising:
   a base comprising limestone, and a binder present at a level less than 34% by weight of the base, so that the tile has rigidity;
   and
   a decorative layer,
   wherein the base, and the decorative layer together form a resilient floor tile having:
   a top surface with a contoured edge along its perimeter, which contoured edge has an outermost contoured surface, and a bottom surface,
and further wherein the decorative layer extends over at least a portion of the contoured edge.

2. The resilient floor tile of claim 1, wherein the limestone is present in an amount of at least 66% of the weight of the base.

3. The resilient floor tile of claim 1, wherein the limestone is present in an amount of at least 72% of the weight of the base.

4. The resilient floor tile of claim 1, wherein the limestone is present in an amount of at least 74% of the weight of the base.

5. The resilient floor tile of claim 1, wherein the limestone is present in an amount of at least 80% of the weight of the base.

6. The resilient floor tile of claim 1, wherein the limestone is present in an amount of at least 82% of the weight of the base.

7. The resilient floor tile of claim 1, wherein the limestone is present in an amount of at least 83% of the weight of the base.

8. The resilient floor tile of claim 1, wherein:
the base comprises limestone and a polymeric resin.

9. The resilient floor tile of claim 8, wherein:
the base comprises limestone and a vinyl based resin.

10. The resilient floor tile of claim 8, wherein:
the base comprises limestone and a polyvinylchloride resin.

11. The resilient floor tile of claim 8, wherein:
the base comprises limestone and polyvinylchloride homopolymer.

12. The resilient floor tile of claim 8, wherein:
the base comprises limestone and acetate polyvinylchloride.

13. The resilient floor tile of claim 1, wherein the contoured edge comprises a convex edge.

14. The resilient floor tile of claim 1, wherein the contoured edge comprises a beveled edge.

15. The resilient floor tile of claim 1, wherein the contoured edge and the top surface are substantially free of micro cracks.

16. The resilient floor tile of claim 1, wherein the decorative layer extends over the entire outermost contoured surface.

17. The resilient floor tile of claim 1, wherein the decorative layer extends over the entire contoured edge.

18. The resilient floor tile of claim 1, further comprising:
a vertical side wall extending from the bottom surface of the tile to the outermost contoured surface so that the tile, when positioned adjacent another tile, can be grouted.

19. The resilient floor tile of claim 18, wherein the vertical side wall is substantially solid in that it does not have preformed openings or openings of predetermined shapes or sizes.

20. The resilient floor tile of claim 1 wherein:
the base further comprises one or more plasticizers.

21. The resilient floor tile of claim 1 or claim 20, wherein:
the base further comprises one or more pigments.

22. The resilient floor tile of claim 1, wherein the binder is present at a level less than 28% of the base.

23. The resilient floor tile of claim 22, wherein:
the vertical side wall is substantially solid in that it does not have preformed openings or openings of predetermined shapes or sizes.

24. The resilient floor tile of claim 1, wherein the binder is present at a level less than 26% of the base.

25. The resilient floor tile of claim 1, wherein the binder is present at a level less than 20% of the base.

26. The resilient floor tile of claim 1, wherein the binder is present at a level less than 18% of the base.

27. The resilient floor tile of claim 1, wherein the binder is present at a level less than 17% of the base.

28. The resilient floor tile of claim 1, wherein the base is approximately 50-200 mils thick.

29. The resilient floor tile of claim 1, wherein the tile has a thickness of approximately 4 mm.

30. The resilient floor tile of claim 1, which resilient floor tile is square in shape.

31. The resilient floor tile of claim 1, which resilient floor tile has a size selected from the group consisting of
9"×9";
12"×12";
14"×14";
16"×16"; and
18"×18".

32. The resilient floor tile of claim 1, which resilient floor tile is round in shape.

33. The resilient floor tile of claim 1, which resilient floor tile is oval in shape.

34. The resilient floor tile of claim 1, which resilient floor tile is rectangular in shape.

35. The resilient floor tile of claim 1, which resilient floor tile is a polygon in shape.

36. The resilient floor tile of claim 1, wherein the decorative layer comprises a plurality of chips.

37. The resilient floor tile of claim 36, wherein the plurality of chips is disposed on top of the base.

38. The resilient floor tile of claim 36, wherein the plurality of chips is embedded in the base.

39. The resilient floor tile of claim 36, wherein the plurality of chips is dispersed throughout the base.

40. The resilient floor tile of claim 36, wherein the resilient floor tile comprises a protective layer on the base, and the plurality of chips is embedded in the protective layer.

41. The resilient floor tile of claim 1, wherein the decorative layer comprises an ink layer on a top-print film.

42. The resilient floor tile of claim 1, wherein the decorative layer comprises an ink layer on a back-print film.

43. The resilient floor tile of claim 1 further comprising a protective layer, wherein:
the decorative layer is disposed between the base and the protective layer.

44. The resilient floor tile of claim 43 further comprising:
a bottom coat.

45. The resilient floor tile of claim 44 wherein the bottom coat comprises a polymeric film.

46. The resilient floor tile of claim 1 or claim 43, further comprising:
a second protective layer disposed on the bottom surface of the tile.

47. The resilient floor tile of claim 43, wherein:
the decorative layer comprises a printed ink forming a decorative pattern disposed between the base and the protective layer.

48. The resilient floor tile of claim 43, wherein:
the protective layer comprises a polymeric film.

49. The resilient floor tile of claim 1 or claim 43, further comprising a top coat.

50. The resilient floor tile of claim 49, wherein the top coat comprises a polymeric film.

51. The resilient floor tile of claim 50, wherein the top coat comprises urethane.

52. The resilient floor tile of claim 49 further comprising: a bottom coat.

53. The resilient floor tile of claim 52 wherein the bottom coat comprises a polymeric film.

54. The resilient floor tile of claim 1 further comprising: a bottom coat.

55. The resilient floor tile of claim 54 wherein the bottom coat comprises a polymeric film.

56. A resilient floor tile, comprising:
a base comprised of about 80% limestone and about 20% organic binder;
a protective film layer; and
a decorative layer disposed between the base and the protective film layer, wherein the base, the protective film layer, and the decorative layer together form a resilient floor tile having:
a top surface with a contoured edge along its perimeter, which contoured edge has an outermost contoured surface, and
a bottom surface,
and further wherein the decorative layer extends over at least a portion of the contoured edge.

57. The resilient floor tile of claim 56, further comprising:
a vertical side wall extending from the bottom surface of the tile to the outermost contoured surface so that the tile, when positioned adjacent another tile, can be grouted.

58. The resilient floor tile of claim 57, wherein the vertical side wall is substantially solid in that it does not have preformed openings or openings of predetermined shapes or sizes.

59. The resilient floor tile of claim 56, wherein the base comprises a vinyl resin.

60. The resilient floor tile of claim 56, wherein the base comprises one or more components selected from the group consisting of: a stabilizer, a plasticizer, and combinations thereof.

61. The resilient floor tile of claim 56, wherein the base comprises:
limestone;
vinyl resin; and
at least one additional component selected from the group consisting of melamine, stabilizer, plasticizers, $TiO_2$, and combinations thereof.

62. The resilient floor tile of claim 61, wherein the vinyl resin is a vinyl acetate copolymer.

63. The resilient floor tile of claim 61 or claim 62, wherein the total organic content of the base is about 17%.

64. The resilient floor tile of claim 56, wherein the base contains about 83% inorganic material and about 17% organic material.

65. The resilient floor tile of claim 56, wherein the base contains about 82% inorganic material and about 18% organic material.

66. A resilient floor tile made by a process comprising:
preheating a printed tile blank;
cutting the printed tile blank; and
molding the printed tile blank to form a contoured edge along a top, outer perimeter of the printed tile blank, which convex edge has an outermost convex surface,
wherein the cutting and molding are performed concurrently to form a resilient floor tile comprising a base and a decorative layer, wherein the base, and the decorative layer together form a resilient floor tile having: a top surface with a contoured edge along its perimeter, which contoured edge has an outermost contoured surface, and a bottom surface and further wherein the decorative layer extends over at least a portion of the contoured edge, wherein the base comprises limestone and a binder that is present at a level less than 34% by weight of the base.

* * * * *